(12) United States Patent
Saito (10) Patent No.: US 6,217,923 B1
(45) Date of Patent: Apr. 17, 2001

(54) METHOD OF FRYING FOOD

(76) Inventor: Ryoichi Saito, 1-14-31 Katayama, Nitza-Shi, Saitama, P.C. 352-0025 (JP)

( * ) Notice: Subject to any disclaimer, the term of this patent is extended or adjusted under 35 U.S.C. 154(b) by 0 days.

(21) Appl. No.: 09/561,619

(22) Filed: May 2, 2000

Related U.S. Application Data (62) Division of application No. 09/296,918, filed on Apr. 22, 1999, now Pat. No. 6,101,929.

(30) Foreign Application Priority Data

Apr. 24, 1998 (JP) .................................. 10-115250

(51) Int. Cl.$^7$ ........................................................ A23L 1/00
(52) U.S. Cl. ............................ 426/233; 426/438; 426/523
(58) Field of Search ..................................... 426/231, 233, 426/438, 523, 509; 99/331, 403, 408

(56) References Cited

U.S. PATENT DOCUMENTS

| | | | |
|---|---|---|---|
| 4,968,516 | * 11/1990 | Thompson | 426/438 |
| 5,942,269 | * 8/1999 | Casey et al. | 426/438 |

* cited by examiner

*Primary Examiner*—George C. Yeung
(74) *Attorney, Agent, or Firm*—Bracewell & Patterson, LLP; James E. Bradley (57) ABSTRACT

There is provided a fryer, which can restrain an acceleration of oxidation of an oil layer, prevent deterioration of the oil layer caused by fry sediment and carbide and generation of oil smoke, and which is used easily and safely by even a person who is not conversant with timing when drainage should be carried out in accordance with an amount of fried food. The fryer according to this invention comprises a fry vessel 10 containing water and oil therein, and having an oil layer formed on a water layer by a difference therebetween in specific gravity, heating pipes 14, formed in the fry vessel, for heating the oil layer, cooling pipes 16, formed at the lower portion of the heating pipes in the fry vessel, for cooling a portion of the oil layer formed at the lower portion of each heating pipe, water level detecting means 40 for detecting the arrival of a boundary surface between the oil layer and the water oil to a predetermined position of the lower portion of each heating pipe, and oil layer heating control means, connected to the water level detecting means, for stopping the heating of the oil layer due to the heating pipes by the detection of the boundary surface.

7 Claims, 4 Drawing Sheets

METHOD OF FRYING FOOD

This application is a divisional of application Ser. No. 09/296,918 filed Apr. 22, 1999, now U.S. Pat. No. 6,101,929.

BACKGROUND ART

1. Field of the Invention

The present invention relates to a fryer, and more specifically to a fryer comprising a fry vessel containing water and oil therein and having an oil layer formed on a water layer due to a difference therebetween in specific gravity, and heating pipes, provided in the fryer vessel, for heating the oil layer, and cooling pipes, provided at a lower portion the fryer vessel than the heating pipes, for cooling the oil layer at the lower portion of the fryer vessel.

2. Description of Related Art

Fryers having an oil layer and a water layer are widely known from, for example, Publication of Examined Japanese Patent Application No. 55-40249. In the conventional fryer of the above-mentioned kind, water and oil are contained in a fry vessel, thereby forming a water layer and an oil layer, and a boundary surface therebetween is positioned at a slightly lower portion of the cooling pipes. Then, heating air heated by combustion gas and the combustion gas are passed through the heating pipes as heating fluid so that the oil layer of the fry vessel is heated. Then, air is passed through the cooling pipes as cooling fluid so that the lower portion of the oil layer is cooled. This restrains an acceleration of oxidation of the oil layer caused by an increase in temperature of the entire oil layer. At the same time, this prevents the temperature of the water layer of the fry vessel from being increased. Also, fry sediment and carbide deposited out of the heated oil layer are precipitated in the water layer so that they are prohibited from floating into the oil layer. This prevents deterioration of the oil layer caused by the fry sediment and carbide and generation of oil smoke caused by the carbide. For this reason, the necessity of an oil filtering process is eliminated, and an oil exchange cycle exists so that an amount of waste oil is lessened.

In the conventional fryer of the above-mentioned kind, however, the amount of the fry sediment and that of carbide, which are generated from fried food and precipitated in the water layer, are increased with an increase in the amount of the fried food. As a result, the boundary surface between the water layer and the oil layer rises. When the boundary surface comes close to the heating pipes, temperature of the water layer rises. As a result, there is an increased danger that steam explosion may occur on the boundary surface and heated oil may be scattered. In order to avoid such a danger, the user must carry out drainage to discharge the fry sediment and carbide from the water layer through a drain valve provided at the lower end of the fry vessel. For this reason, the user has to be conversant with the timing of when drainage should be carried out.

BRIEF SUMMARY OF THE INVENTION

The present invention has been made in consideration of the above-mentioned problem, and an object of the present invention is to provide a fryer, which can restrain an acceleration of oxidation of an oil layer, prevent deterioration of the oil layer caused by fry sediment and carbide and generation of oil smoke, and which is used easily and safely by even a person who is not conversant with timing when drainage should be carried out.

In order to attain the above-mentioned object of the present invention, there is provided a fryer comprising a fry vessel containing water and oil therein, and having an oil layer formed on a water layer by a difference therebetween in specific gravity; heating pipes, formed in the fry vessel, for heating the oil layer; cooling pipes, disposed in the fry vessel at a lower portion of the oil layer than the heating pipes, for cooling a lower portion of the oil layer; water level detecting means for detecting the arrival of a boundary surface between the oil layer and the water layer to a first predetermined position located at the lower portion of the heating pipes; and oil layer heating control means, connected to the water level detecting means, for stopping the heating of the oil layer with the heating pipes by the detection of the arrival of the boundary surface at the first predetermined position.

In the fryer according to the present invention, the lower portion of the oil layer is cooled so as to restrain the acceleration of oxidation of the oil layer caused by an increase in temperature of the entire oil layer. At the same time, this prevents the temperature of the water layer of the fry vessel from being increased. Also, fry sediment and carbide deposited out of the heated oil layer portion are precipitated in the water layer so as to be prohibited from floating into the oil layer. And, this prevents deterioration of the oil layer caused by the fry sediment and carbide and generation of oil smoke caused by carbide. Moreover, in the fryer according to the present invention, the boundary surface between the water layer and the oil layer rises by the increase in the amount of fry sediment and that of carbide generated from fried food and precipitated in the water layer as the result of the increase in the amount of fried food cooked. At this time, a water level detecting means detects that the boundary surface has reached the first predetermined position of the lower portion of the heating pipes in the fry vessel. Then, an oil layer heating control means, connected to the water level detecting means, stops the heating of the oil layer with the heating pipes. For this reason, even a person, who is not conversant with the timing of when drainage should be carried out can avoid a danger that a steam explosion may occur on the boundary surface, thereby preventing heated oil from being scattered.

In the fryer according to the present invention, the water level detecting means preferably detects the arrival of the boundary surface to a second predetermined position in the lower portion of the fry vessel, whereby the oil layer heating control means restarts the heating of the oil layer through heating pipes with the detection of the arrival of the boundary surface to the second predetermined position after the detection of the arrival of the boundary surface to the second predetermined position by the water level detecting means.

In the fryer according to the present invention, in order to avoid the danger that steam explosion may occur on the boundary surface thereby scattering heated oil, the water level detecting means detects that the boundary surface has reached the first predetermined position of the lower portion of the oil layer in the fry vessel. Then, the oil layer heating control means stops the heating of the oil layer with the heating pipes. Thereafter, the user carries out drainage through the a drain valve provided at the lower end of the fry vessel to discharge the fry sediment and carbide, so that the boundary surface is moved downward away from the first predetermined position of the lower portion of the oil layer. As a result, when the danger is avoided, the water level detecting means detects the arrival of the boundary surface to the second predetermined position, and the oil layer heating control means restarts the heating of the oil layer with the heating pipes. For this reason, even if the user is not familiar with the fryer, intermittent detection time, and the time required for re-heating the oil layer can be reduced, thereby resulting in increased overall efficiency of the fryer and increased thermal efficiency of the fryer.

In the fryer according to the present invention, the oil layer heating control means preferably comprises alarming means for generating an alarm when the water level detecting means detects the arrival of the boundary surface to the first predetermined position. The alarming means may be an audio alarm such as a buzzer or a bell, or a visual alarm such as a lamp or a flashing light, or an alarm using a combination of both.

In the fryer according to the present invention, to avoid the danger that steam explosion may occur on the boundary surface and that heated oil may be scattered, a control system and control panel allow the user to immediately know that the water level detecting means has detected that the boundary surface has reached the first predetermined position of the lower portion of the oil layer in the fry vessel. Then, the oil layer heating control means stops the heating of the oil layer with the heating pipe. For this reason, thereafter, the user carries out drainage through the drain valve provided at the lower end of the fry vessel to discharge the fry sediment and carbide so that the boundary surface is moved downward away from the first predetermined position of the lower portion of the oil layer. The danger can be avoided in such a manner, and the time required before the oil layer is heated again with the heating pipes can be reduced. For this reason, the down time and the time required for re-heating the oil layer can be lessened, with the result that the overall efficiency of the fryer is increased and the thermal efficiency of the fryer is improved.

The oil layer heating control means preferably comprises another alarming means for issuing an alarm when the water level detecting means further detects the arrival of the boundary surface to the second predetermined position of the lower portion of the oil layer in the fry vessel, and the oil layer heating control means restarts the heating of the oil layer with the heating pipes by the detection of the arrival of the boundary surface to the second predetermined position after the water level detecting means detects the arrival of the boundary surface to the second predetermined position. This makes it possible to prevent the user of the flyer from carrying out drainage excessively.

In the fryer according to the present invention, the oil layer heating control means allows water to be heated selectively by the heating pipes regardless of the detection of the boundary surface by the water level detecting means while only water is contained in said fry vessel.

In the fryer according to the present invention, the fry vessel can be sterilized by boiling water contained in the fry vessel.

In the fryer according to the present invention, the outlet of each of the heating pipes and that of each of the cooling pipes are mutually communicated with each other, and cooling fluid to be discharged from the outlet of the cooling pipe is sucked by heating fluid to be discharged from the outlet of the heating pipe.

In the fryer according to the present invention, the fryer further comprises heating fluid staying time extending means, provided in the heating pipes, for extending staying time of the heating fluid in the heating pipes.

A principle advantage of the fryer according to the present invention is that the thermal efficiency of the fryer is improved, and a reduction in the operating cost of the fryer is realized.

In the fryer according to the present invention, the cross section of each of the cooling pipes and that of the heating pipes can be formed to be various shapes including an ellipse instead of a circle. The heating fluid staying time extending means can comprise at least one baffle member, which has a cross section smaller than the cross section formed in the heating pipe, and which resists the heating fluid passing through the heating pipe.

The heating fluid staying time extending means can comprise a wall, which divides a lower extending space extending along the lower end portion of the heating pipe, and at least one baffle member, which is provided on the outer surface of the wall and which resists the heating fluid passing through the outside of the outer surface of the wall in the heating pipe. According to the above-explained structure, if the heating pipes are heated by fuel such as kerosene oil or gas to be burned at the inlet of the heating pipes, the heating air and combustion gas are rapidly passed through the lower extending space so as to improve the combustion efficiency at the inlet of the pipes. Also, time for which the heating air and the combustion gas pass through the outside of the outer surface of the wall in the heating pipe is extended so as to boost the thermal efficiency of the heating pipes. If a plurality of baffle members is provided on the outer surface of the wall, the heights of the baffle members projected from the outer surface of the wall may be of varying heights.

DETAILED DESCRIPTION OF THE PREFERRED EMBODIMENT

The preferred embodiment of the present invention will now be described with reference to the accompanying drawings.

Figure 1A:
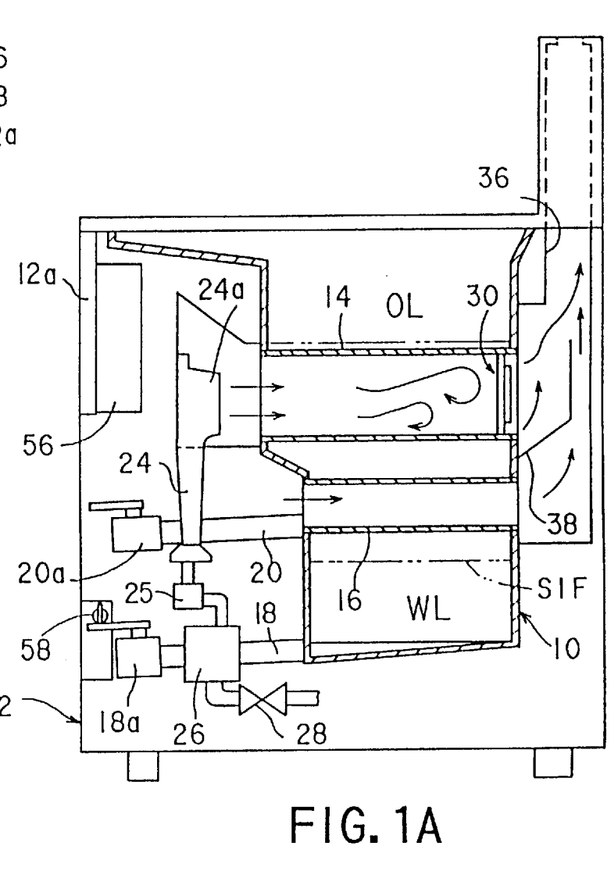
FIG. 1A is a vertical cross-sectional view schematically showing a fryer according to the preferred embodiment of the present invention.
Figures 1B, 1C, 1D:
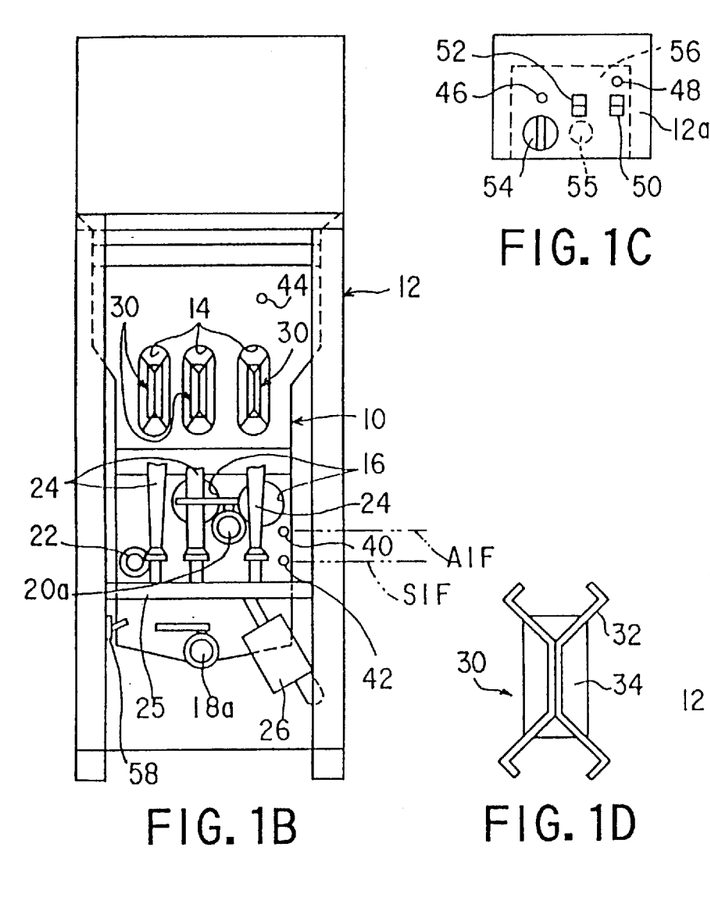
FIG. 1B is a front view schematically showing the fryer of FIG. 1A, wherein a control panel and a combustion section of a gas burner are omitted.
FIG. 1C is a front view schematically showing only the control panel of the fryer of FIG. 1A.
FIG. 1D is an enlarged front view schematically showing means for extending heating fluid staying time, which is provided at an outlet of the heating pipe of the fryer of FIG. 1A.

Referring first to FIGS. 1A–1D, the structure of the fryer according to the preferred embodiment of the present invention will be specifically explained. Note that FIG. 1A is a vertical cross-sectional view schematically showing the fryer according to preferred embodiment of the present invention, FIG. 1B is a front view schematically showing the fryer of FIG. 1A wherein a control panel and a combustion section of a gas burner are omitted, FIG. 1C is a front view schematically showing only the control panel of the fryer of FIG. 1A, and FIG. 1D is an enlarged front view schematically showing means for extending heating fluid staying time, which is provided at an outlet of a heating pipe of the fryer.

As shown in FIGS. 1A–1D, the fryer according to the preferred embodiment of the present invention comprises a fry vessel 10 opened at an upper portion. The fry vessel 10 is supported by a support frame 12. In the fry vessel 10, heating pipes 14 and cooling pipes 16 are provided. The heating pipes 14, which pass from a front wall to a back wall in a watertight manner, are substantially horizontally placed at a slightly upper portion of an intermediate portion between upper and lower directions. The cooling pipes 16, which pass from the front wall to the back wall in a watertight manner, are substantially horizontally placed at a slightly lower portion of the intermediate portion. The number of heating pipes 14 and that of cooling pipes 16 can be freely set, depending on, for example, a capacity of the fry vessel 10, that is, an amount of using oil for fried food, and oil temperature. However, it is preferred that the number of heating pipes 14 is three and that of cooling pipes 16 is two, as is obvious from FIG. 1B. Also, the cross-section of the heating pipe 14 and that of the cooling pipe 16 can be freely set for the same reason as mentioned above. However, as is obvious from FIG. 1B, it is preferred that the cross-section of the heating pipe 14 is an ellipse extending in upper and lower directions and that the cross-section of the cooling pipe 16 is a circle.

A predetermined amount of oil for fried food and that of water are contained in the fry vessel 10. A water layer WL is formed at a lower portion of the fry vessel 10 and an oil layer OL is formed on the water layer due to a difference between water and oil in specific gravity. The predetermined amount of oil and that of water are set such that a boundary surface between the water layer and the oil layer is placed at a predetermined level SIF, which is lower than the cooling pipe 16.

As shown in FIG. 1B, a bottom wall of the fry vessel 10 is shallowly V-shaped, and inclined as directing from the back wall to the front wall as shown in FIG. 1A. A drainpipe 18 with a drain valve 18a is connected to a lower end portion of the front wall of the fry vessel 10. An oil-removing pipe 20 with an oil-removing valve 20a is connected to a portion at substantially the same level as the level of the cooling pipe 16 on the above front wall. Moreover, a viewing window 22 is provided at the same level as the predetermined level SIF of the boundary surface on the front wall.

A combustion portion 24a of a gas burner 24 serving as heating means is provided at a position, which is opposite to the inlet opening of each of the three heating pipes 14. Each of the three gas burners 24 is connected to a gas supply source (not shown) by a gas pipe 25 through a remote-controlled opening and closing valve, e.g., an electromagnetic opening and closing valve 26, and a manual main cock 28. The combustion portion 24a of each of the three gas burners 24 is provided with igniting means, for example, a pilot burner (not shown).

Each of three heating pipes 14 has heating fluid staying time extending means 30. The heating fluid staying time extending means 30 extends time for which heating air heated as heating fluid by the combustion portion 24a of the gas burner 24 as heating means, provided at the inlet opening of the heating tube 14, and combustion gas as heating fluid should be stayed in the heating pipe 14 to boost thermal efficiency in the heating pipe 14. As shown in the enlarged view of FIG. 1D, the heating fluid staying time extending means 30 includes one plate-like baffle member 34 fixed to a supporter 32 close to the outlet opening that opens to the back wall of the fried vessel 10 on an inner peripheral surface of each of the heating pipes 14. A cross-sectional area of the baffle member 34 is smaller than that of each of the heating pipes 14. Regarding the shape of the baffle member 34, the cross-sectional area, and the number of baffle members 34, they can be set to any shape, size, and the number in order to boost, as a whole, efficiency of heating means, i.e., combustion efficiency in the combustion portion 24a of the gas burner 24, and heat efficiency in the heating pipe 14, i.e., heating efficiency provided to the heating pipe 14 by heating fluid. The shape thereof is not limited to two-dimensions, and three-dimensional shape may be used.

The outlet opening of each of the heating pipes 14 is connected to an exhaust conductor 36 covering the back wall of the fry vessel 10 and extending upwardly. It is preferred that the exhaust conductor 36 is also connected to the outlet opening of each of two cooling pipes 16. Then, the outlet opening of each of the heating pipes 14 and each of the outlet opening of each of the cooling pipes 16 are separated from each other by a heating fluid/cooling fluid outlet wall 38. The heating fluid/cooling fluid outlet wall 38 extends to a slightly upper portion of the outlet opening of each of the heating pipes 14 between the outlet opening of each of the heating pipes 14 and that of each of the cooling pipes 16 in the exhaust conductor 36. For this reason, the outlet opening of each of the heating pipes 14 and that of each of the cooling pipes 16 are communicated with each other at the downstream side of the heating fluid/cooling fluid outlet wall 38 in the exhaust conductor 36.

Moreover, on the front wall of the fry vessel 10, there are provided a first water level detector 40 and a second water level detector 42. The first water level detector 40 is placed at a first predetermined position of the lower portion of the heating pipe 14, that is, level AIF, which is substantially the same as the lower end of the cooling pipe 16. The second water level detector 42 is placed at a second predetermined position of lower than the first water level detector 40, that is at a level which is substantially the same as the predetermined level SIF of the boundary surface between the oil layer and the water layer. Then, the first water level detector 40 and the second water level detector 42 are included in water level detecting means for detecting the level, that is, the water level, of the boundary surface SIF in the fry vessel 10. It is needless to say that any structure of water level detecting can be used if the structure serves the function required in water level detecting means in the present invention.

Figure 2:
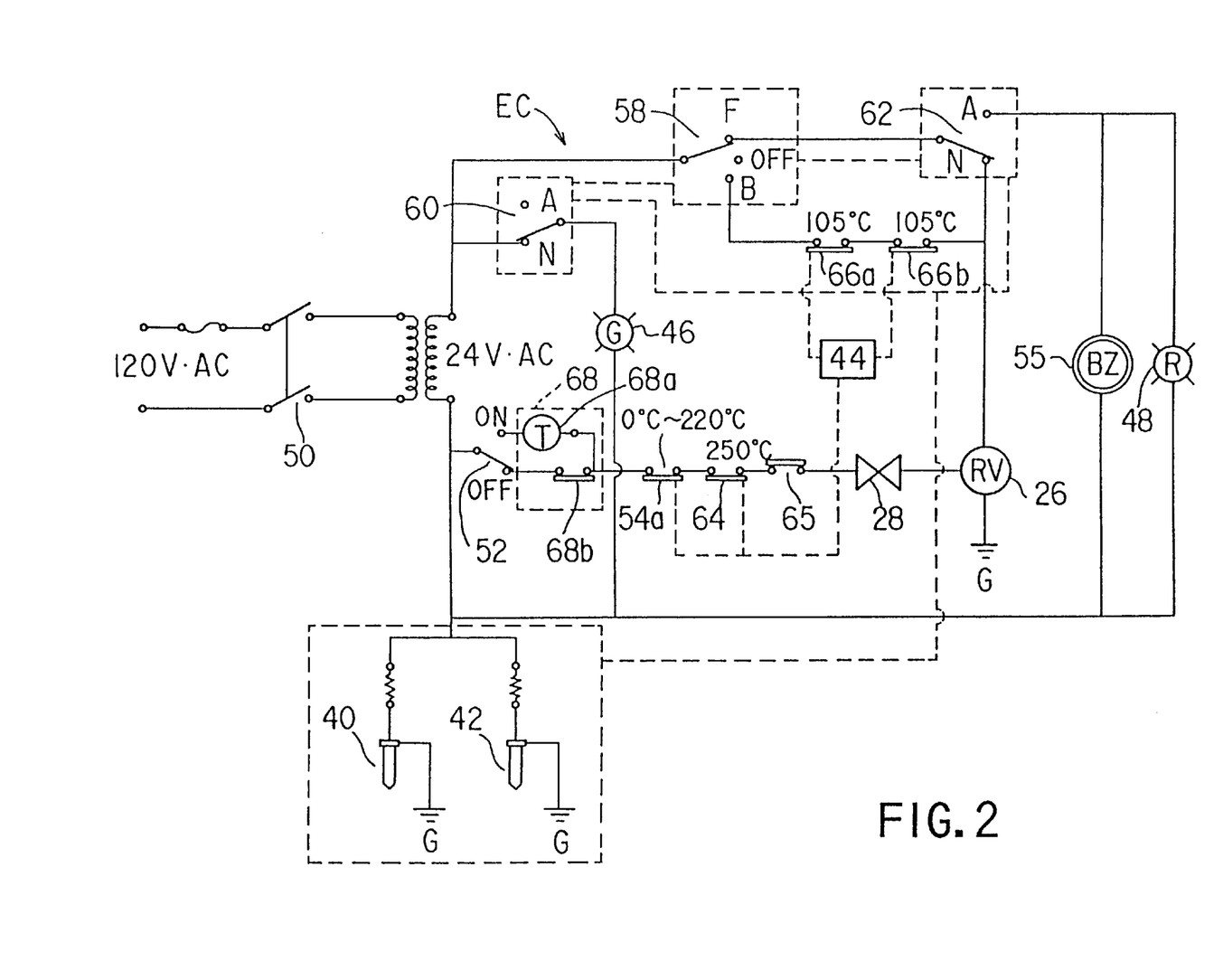
FIG. 2 is a circuit diagram schematically showing an electrical circuit using as oil layer heating control means for controlling the heat of an oil layer in the fryer according to the preferred embodiment of the present invention.

Furthermore, on the front wall of the fry vessel 10, there is provided a known temperature detector 44 at a position corresponding to the upper portion of the oil layer of the fry vessel 10 used most in fried food. The temperature detector 44 is used to detect temperature of the fry vessel 10. The upper portion of the front portion of the support frame 12 is covered with a control panel 12a. As shown in FIG. 1C, on the surface of the control panel 12a, there are provided various alarm lamps 46, 48 serving as alarming means using light, a main power switch 50, a melt cycle setting switch 52 for a melt cycle operation to be described later, and a temperature setting dial 54 for setting temperature of the upper portion of the oil layer of the fry vessel 10 used most in fried food. Note that the preferred range of the predetermined temperature is about 0° C. to 220° C. On the back side of the control panel 12a, there is provided a control box 56, which stores various electric and electronic components including an alarm buzzer 55 serving as alarming means using sound. Also, at a portion, which is the inner surface of the support frame 12 and is close to the front opening, there is provided a functions selector switch 58 is provided. The function selector switch 58 is used to switch the function of the fry vessel 10 to a fry function, a stop function, and a boil function, which are be described later. Next, in the fryer according to the preferred embodiment of the present invention shown in FIGS. 1A–1D, an operation of the fryer according to this invention will be specifically explained with reference to FIG. 2 schematically showing an electric circuit serving as oil layer heating controlling means for controlling heating of the oil layer together with FIGS. 1A–1D. For carrying out a frying process using the fryer of FIGS. 1A–1D, a predetermined amount of oil for fry and that of water are contained in the fry vessel 10, and the manual main cock 28 for gas is opened. Then, the function selector switch 58 is set to a fry function setting position F. After that, a predetermined temperature is set to a thermostat 54a of the control box 56 with the temperature setting dial 54 so as to turn on the main power switch 50. Thereafter, igniting means, for example, a pilot burner (not shown) for the combustion portion 24a of each of three burners 24 is turned on.

In this state, the boundary surface between the oil layer and the water layer in the fry vessel 10 is positioned at the predetermined level SIF, and the boundary surface can be viewed through the viewing window 22. Moreover, the second water level detector 42, which is provided downwardly, detects the boundary surface. Then, first and second water level relay switches 60, 62 which work in response to the first and second water level detectors 40, 42 and the function selector switch 58, a reset to a normal position N. Also, the melt cycle setting switch 52 is placed at an OFF position.

As a result, the remote-controlled opening and closing valve 26 is opened, igniting means, e.g., pilot burner (not shown), for the combustion portion 24a of each of three burners 24 is turned on. Also, the alarm lamp 46, for example, green lamp, which indicates no abnormality in the operation of the fryer, is turned on. Until the temperature detector 44, which is positioned at the upper portion of the fryer vessel 10, detects the above predetermined temperature, the valve 26 supplies gas to the combustion portion 24a of each of three gas burners 24 so as to perform gas combustion in the combustion portion 24a of each of three gas burners 24. Then, when the above-predetermined temperature is detected, the opening and closing valve 26 stops the gas supply so that gas combustion in the combustion portion 24a of each of three gas burners 24 is stopped. When the temperature detector 44 detects the lower limit of the temperature of the predetermined range, which is lower than the above predetermined temperature, the valve 26 supplies gas as explained above until the above predetermined temperature is detected again to perform the gas combustion in the combustion portion 24a of each of three gas burners 24 is performed.

In the preferred embodiment, a high limit switch 64 for preventing an excessive temperature rise of the oil layer is incorporated into the electric circuit of FIG. 2. In the preferred embodiment, the operation starting temperature of the high limit switch 64 is set to 250° C. If the high limit switch 64 is operated, the remote-controlled opening and closing valve 26 stops supplying gas to the combustion portion 24a of each of three gas burners 24. Also, in the electric circuit of FIG. 2, igniting means operation confirming means, for example, an opening and closing switch 65 using a thermocouple or bimetal is provided. The opening and closing switch 65 is used to stop the opening and closing valve 26 from supplying gas to igniting means, e.g., pilot burner (not shown), and the combustion portion 24a of each of three gas burners 24 when igniting means and the combustion portion 24a go out.

Air and combustion gas heated by the combustion portions 24a of three gas burners 24 flow into three heating pipes 14. Then, the upper portion of the heating pipe 14, which is used most for fried food in the oil layer, is heated. In this case, the heated air and combustion gas swirl in three heating pipes 14 by the baffle member 34 of heating fluid staying time extending means 30. Then, staying time of the heated air and combustion gas in three heating pipes 14 is extended, so that efficiency of heating the pipes 14, that is, thermal efficiency is improved. The heating fluid, including the heating air and combustion gas discharged to the exhaust conductor 36 from three heating pipes 14, is mixed with non-heating air, i.e., cooling fluid in the preferred embodiment, communicating with the cooling pipes 16 at the end of the heating fluid/cooling fluid outlet wall 38. Then, the heating fluid is discharged from the outlet of the upper portion of the exhaust conductor 36 together with the non-heating air. As a result, the flow of non-heating air into the cooling pipes 16 is accelerated, and cooling efficiency of cooling pipes 16 due to the non-heated air is improved. The cooling pipes 16 restrain the temperature rise of oil around the cooling pipes 16 in the oil layer, and also restrains the temperature rise of the water layer positioned under the oil layer. As a result, the oil of the oil layer is effectively prevented from being scattered to the outer section from the opening of the upper portion of the fry vessel 10 by occurrence of steam explosion on the boundary surface between the oil layer and the water layer. Also, the oil around the cooling pipes 16 whose temperature rise is restrained controls the average of the entire temperature of the oil layer so as to prevent oxidation of the oil layer. Moreover, in the oil layer, fry sediment and carbide generated from the fried food at the upper portion of the heating pipes 14 are precipitated in the water layer so as to reduce the deterioration of the oil layer and the occurrence of oil smoke. Resultantly, there can be achieved an increase in life of the oil layer, a boost in efficiency of the frying process resulting from the elimination of the necessity of removing fry sediment and carbide, and the prevention of deterioration of the frying process environment caused by the oil smoke.

It is assumed that the amount of the fry sediment and that of carbide, which are precipitated in the water layer, are of fried food, increased with an increase in the amount that the boundary surface between the oil layer and the water layer rises. Moreover, it is assumed that as the boundary surface comes close to the heating pipe, temperature of the water layer rises, so that there increases a danger that steam explosion may occur on the boundary surface. At this time, the first water level detector 40 provided at the upper portion detects the boundary surface risen up to the level AIF, which is substantially the same as the lower end of the cooling pipe 16. After that, the first and second water level relay switches 60, 62, which work in response to the first and second water level detectors 40, 42, change normal positions N to abnormal positions A. When the first water level relay switch 60 changes normal position N to abnormal position A, the green alarm lamp 46 is turned off. When the second water level relay switch 62 changes normal position N to abnormal position A, the red alarm lamp 48 is turned on, and the alarm buzzer 55 is operated to alarm abnormality of the fryers. Moreover, the second water level relay switch 62 whose position has been changed to abnormal position A stops the remote-controlled opening and closing valve 26 from supplying gas to the combustion portion 24 of each of three gas burners 24.

Thereafter, the drain valve 18a is opened, and the precipitated fry sediment and carbide are discharged from the bottom of the fry vessel 10 with water so as to move down the boundary surface. When the second water level detector 42 at the lower portion detects the boundary surface again, the first and second water level relay switches 60, 62, which work in response to the first and second water level detectors 40, 42, change from abnormal positions A to normal positions N. As a result, the red alarm lamp 48 for alarming abnormality of the fryer is turned off, and the operation of the alarm buzzer 55 is stopped. Instead, the green lamp 46 for indicating that there is no abnormality in the operation of the fryer is turned on. Moreover, the second water level relay switch 62 whose position has been changed to normal position N starts the remote-controlled opening and closing valve 26 to supply gas to the combustion portion 24 of each of three gas burners 24. The combustion portion 24 of each of three gas burners 24 is ignited again by the above-mentioned igniting means (not shown). Then, until the temperature detector 44 detects that the temperature of the upper portion of the oil layer reaches the predetermined temperature set by the temperature setting dial 54, the valve 26 supplies gas to the combustion portion 24a of each of three gas burners 24 so as to perform gas combustion in the combustion portion 24a of each of the three gas burners 24. Then, when the predetermined temperature is detected, the opening and closing valve 26 stops the gas supply to the combustion portion 24a of each of the three gas burners 24, and the gas combustion in the combustion portion 24a of each of three gas burners 24 is stopped. When the temperature detector 44 detects the lower limit of the temperature of the predetermined range, which is lower than the above predetermined temperature, the valve 26 supplies gas as explained above until the above predetermined temperature is detected again to perform gas combustion in the combustion portion 24a of each of the three gas burners 24.

The fryer according to the preferred embodiment can serve a boil function in addition to the aforementioned fry function. In order to carry out the boil function, after the main power switch 50 is turned off, oil and water are removed from the fry vessel 10 through the oil-removing value 20a and the drain valve 18a. Instead, the fry vessel 10 is filled with only water. Next, the function selection switch 58 is changed to a boil function setting position B. Then, the first and second water level relay switches 60 and 62, which work in response to the first and second water level detectors 40, 42, are maintained at normal position N. Under this condition, the current in the circuit short-circuits the second water level relay switch 62 so as to flow into high limit switches 66a, 66b for boiling. As a result, water in the fry vessel 10 is boiled so that the fry vessel 10 can be sterilized by boiling. Each of high limit switches 66a, 66b for boiling is set to be turned off at temperature slightly higher than 100° C., which is normal boiling temperature of water, for example, 105° C. Sterilization of the fry vessel 10 by such a boiling process is obliged to be carried out every predetermined period in, for example, US.

The fryer according to the preferred embodiment can perform a melt cycle operation in addition to the aforementioned fry function and boil function. The melt cycle operation is useful for the case in which solid oil such as solid lard is employed as oil for fry. The melt cycle operation can be executed before the frying process is performed using solid oil. At the time of the melt cycle operation, first, a predetermined amount of only water is contained in the fry vessel 10, and solid oil is placed on the heating pipe 14. Next, the manual main cock 28 for gas is opened, and the function selection switch 58 is set to a fry function setting position F. A predetermined temperature is set to the thermostat 54a of the control box 56 with the temperature setting dial 54 so as to turn on the main power switch 50 and the melt cycle setting switch 52. Thereafter, igniting means, for example, a pilot burner (not shown) for the combustion portion 24a of each of the three burners 24 is turned on.

Thereafter, a timer 68a of a melt cycle circuit 68 provided in the control box 56 of the control panel 12a is started so that a melt cycle on/off switch 68b is operated every predetermined period of time, e.g., 15 seconds. As a result, the gas supply to the combustion portion 24a of each of three gas burners 24 by the value 26 is turned on/off every predetermined period of time, and solid oil placed on the heating pipe 14 liquefied without oxidizing by excessive heat. For example, after a predetermined amount of liquid oil such as liquid lard is made out of the solid oil such as solid lard in the fry vessel 10, the melt cycle setting switch 52 is turned off. Thereafter, the fry vessel serves the aforementioned fry function.

Figure 3A:
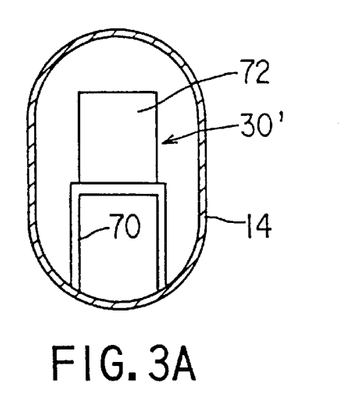
FIG. 3A is a vertical cross-sectional view schematically showing the heating pipe of the fryer according to the preferred embodiment of the present invention, including means for extending heating fluid staying time.
Figure 3B:
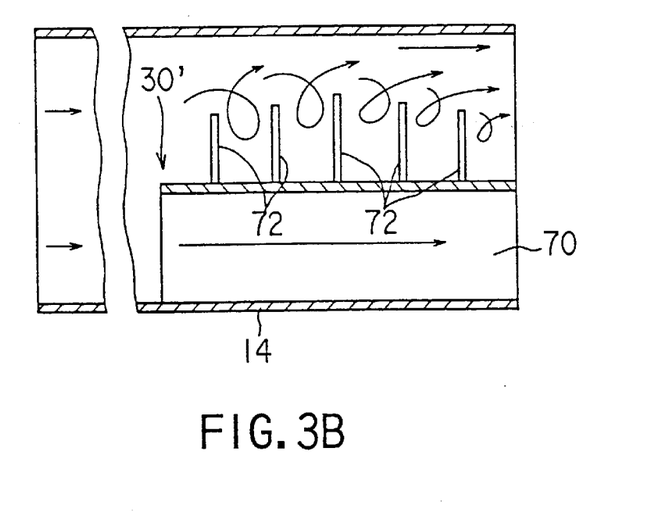
FIG. 3B is a horizontal cross-sectional view schematically showing the heating pipe in which means for extending heating fluid staying time of FIG. 3A is provided.
Figure 3C:
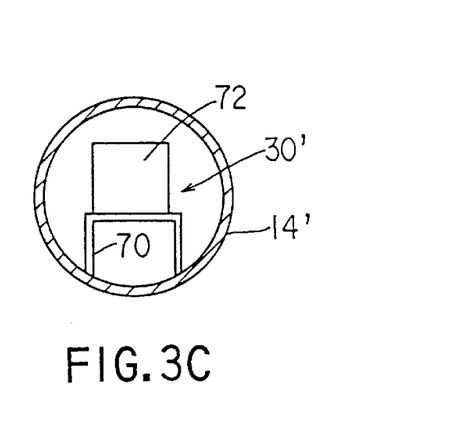
FIG. 3C is a horizontal cross-sectional view schematically showing a modification of the heating pipe including means for extending heating fluid staying time.

Next, a modification of heating fluid staying time extending means will be explained with reference to FIGS. 3A–3C. Note that FIG. 3A is a vertical cross-sectional view schematically showing the heating pipe 14 having heated fluid staying time extending means 30' according to the modification. FIG. 3B is a vertical cross-sectional view schematically showing the heating pipe 14 having heating fluid staying time extending means 30' FIG. 3A. FIG. 3C is a vertical cross-sectional view schematically showing a modification of a heating pipe 14' having heating fluid staying time extending means 30' according to the modification.

As shown in FIGS. 3A and 3B, heating fluid staying time extending means 30' according to the modification includes a wall 70 and at least one baffle member 72 formed on an outer surface of the wall 70. The wall 70 extends in a longitudinal direction of the heating pipe 14 along the lower end portion of the inner peripheral surface of the heating pipe 14. The wall 70 of the modification has an angular cross section, which is substantially U-shaped. A plurality of baffle members 72 is fixed to the outer surface of the flat bottom wall to be separated from each other in the longitudinal direction. Regarding the shape of the baffle member 72, the size, and the number, they can be arbitrarily set similar to the case of the baffle member 34 of heating fluid staying time extending means 30' according to one embodiment shown in FIGS. 1A–1D. Moreover, the height of each of the plurality of plate-like baffle member 72 projected from the wall 70 can be also arbitrarily set similar to the aforementioned case. In this modification, heating fluid containing air, which has been heated by the combustion portion 24a of each of the three gas burners 24 at the inlet opening of the heating pipe 14, and combustion gas can rapidly flow to the outlet opening of the heating pipe 14 in the lower extended space, which the wall 70 divides along the lower end portion the inner peripheral surface of the heating pipe 14. Whereby, fresh air is speedily sucked to the combustion portion 24a of each of the three gas burners 24 from the outer space. This results in improvement of combustion efficiency of the combustion portion 24a of each of the three gas burners 24. Moreover, the heating fluid, which has flowed into the outer side of the wall 70 in the heating pipe 14 from the inlet opening of the heating pipe 14, is resisted by the baffle member 72 and swirls in the heating pipe 14, so that time for which the heating fluid stays in the heating pipe 14 is extended. As a result, the thermal efficiency of the heating pipe 14 having heating fluid staying time extending means 30' of this embodiment is further improved.

The modification of the heating pipe 14' having heating fluid staying time extending means 30' according to the modification of FIG. 3C has a circular cross section. In the heating pipe 14' with the circular cross section, heating fluid staying time extending means 30 of the preferred embodiment shown in FIGS. 1A–1D can be provided in place of heating fluid staying time extending means 30'. As compared with the heating pipe 14 with the ellipse shape, in the heating pipe 14' with the circular cross section, a contact area with the oil layer is small, and efficiency of heat transfer to the oil layer is low. However, since the heating pipe 14' can be easily manufactured, the heating pipe 14' is suitable for the small-sized fryer having the fry vessel with a small capacity.

As explained above, according to the fryer according to this invention, the acceleration of oxidation of the oil layer can be prevented. Also, the deterioration of the oil layer caused by fry sediment and carbide and generation of oil smoke can be prevented. Moreover, the fryer can be used easily and safely by even a person who is not conversant with timing when drainage should be carried out in accordance with an amount of fried food.

Figure 4:
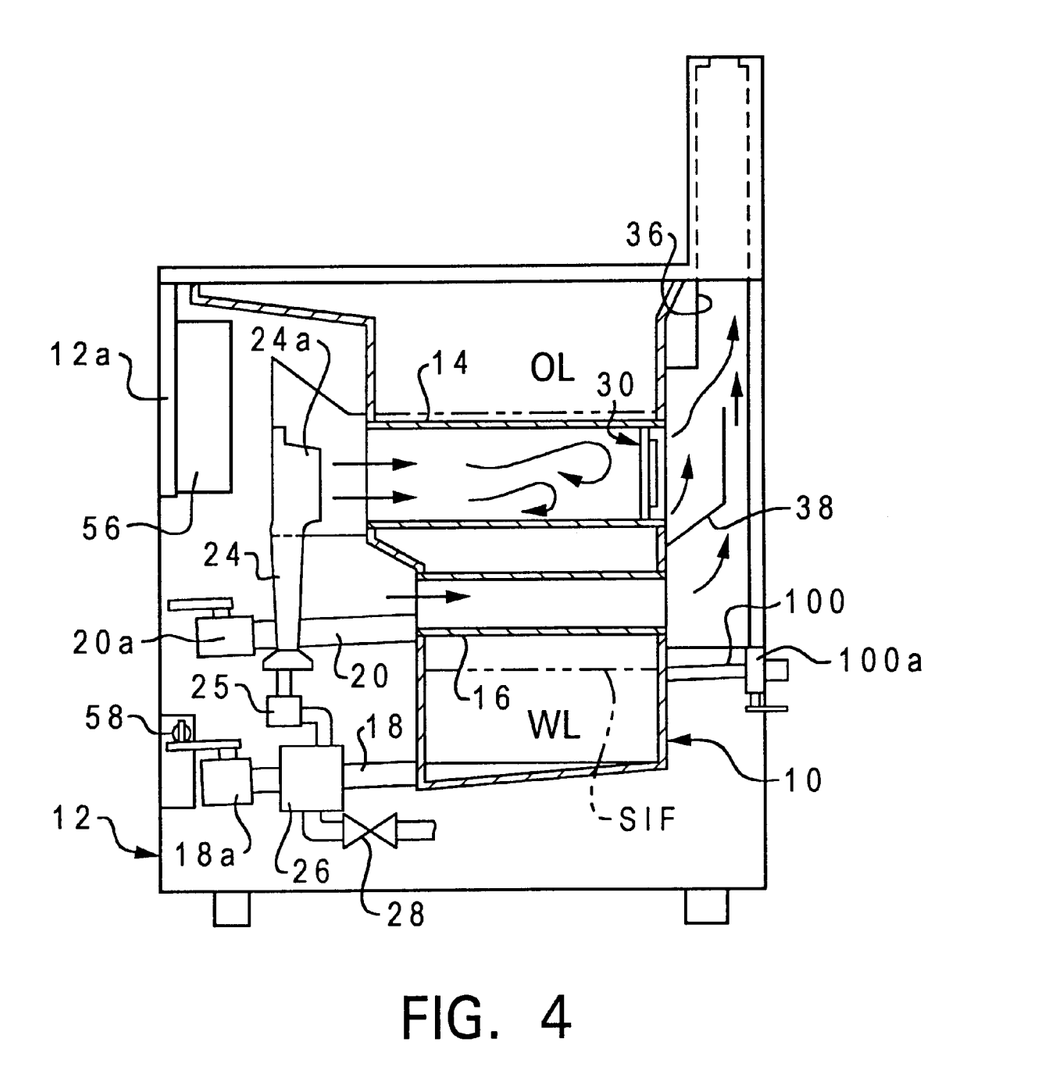
FIG. 4 is an alternate embodiment of the fryer of FIGS. 1A–1D.

Referring now to FIG. 4 in the drawings, an alternate embodiment of the present invention is shown. The embodiment illustrated in FIG. 4 is identical in form and function to the embodiment illustrated in FIG. 1 with the exception that a water inlet means 100 and valve 100a have been added. Water inlet means 100 is in fluid communication with water layer WL and a water source (not shown). Water inlet means 100 and valve 100a allow the water level to be raised without having to drain the oil layer OL. When valve 100 is opened, water from water source flows into water layer WL, thereby raising the boundary surface. Valve 100a is closed when the boundary surface reaches the first predetermined position.

What is claimed is:

1. A method of frying food comprising the steps of:
   providing a frying vessel;
   creating a water layer in said frying vessel;
   creating an oil layer in said frying vessel above said water layer;
   heating said oil layer;
   disposing water level detection means within said frying vessel for detecting when said water layer has risen to a first predetermined location;
   placing said food into said frying vessel;
   discontinuing said heating of said oil layer upon detecting when said water layer has risen to said first predetermined location.

2. The method of frying food according to claim 1, further comprising the steps of:
   disposing heating pipes in an upper portion of said oil layer for said heating of said oil layer;
   disposing cooling pipes in a lower portion of said oil layer for cooling said oil layer.

3. The method according to claim 1, further comprising the steps of:
   providing an alarm means;
   generating an alarm with the alarm means upon said detecting when said water layer has risen to said first predetermined location.

4. The method according to claim 1, further comprising the steps of:
   disposing water level detection means within said frying vessel for detecting when said water layer has lowered to a second predetermined location;
   providing an oil drainage means in fluid communication with said oil layer;
   providing a water drainage means in fluid communication with said water layer;
   draining said water layer through said water drainage means until said water layer reaches said second predetermined location after said water layer has risen to said first predetermined location;
   draining said oil layer through said oil drainage means;
   draining said water layer through said water drainage means, thereby emptying said frying vessel.

5. The method according to claim 3, further comprising the steps of:
   providing a control system for controlling said alarm means.

6. The method according to claim 2, further comprising the steps of:
   disposing heating fluid staying time extending means within said heating pipes for selectively retaining heat within said heating pipes.

7. The method according to claim 2, further comprising the steps of:
   providing a control system for controlling said heating and said cooling pipes.

* * * * *